United States Patent [19]

Kanesaka

[11] Patent Number: 4,458,663
[45] Date of Patent: Jul. 10, 1984

[54] WARMING APPARATUS

[76] Inventor: Ichiro Kanesaka, No. 7-6-301, Minami-Tokiwadai 2-chome, Itabashi-ku, Tokyo, Japan

[21] Appl. No.: 315,964

[22] Filed: Oct. 28, 1981

[30] Foreign Application Priority Data

Nov. 1, 1980 [JP] Japan ............... 55-154514

[51] Int. Cl.³ .............................................. F24C 3/04
[52] U.S. Cl. ............................ 126/85 A; 126/92 AC; 126/92 B; 126/116 A; 431/200; 431/346; 431/351; 431/354
[58] Field of Search ............ 431/198, 200, 195, 346, 431/348, 351, 352, 354, 177; 239/548, 550, 554, 567; 126/116 A, 350 R, 92 R, 92 AC, 92 B, 92 C, 85 A

[56] References Cited

U.S. PATENT DOCUMENTS

| | | | |
|---|---|---|---|
| 1,641,275 | 9/1927 | Hughes | 239/550 X |
| 2,985,137 | 5/1961 | Horne | 126/92 B X |
| 3,065,916 | 11/1962 | Kurzinski | 239/567 X |
| 4,165,963 | 8/1979 | Nozaki | 239/554 X |

FOREIGN PATENT DOCUMENTS 16846 7/1970 Japan .
89245 1/1980 Japan .

OTHER PUBLICATIONS

Space-Ray Corporation, "Facts on Space-Ray", Feb. 1965.

Primary Examiner—Samuel Scott
Assistant Examiner—Kenichi Okuno
Attorney, Agent, or Firm—Frishauf, Holtz, Goodman & Woodward

[57] ABSTRACT

A warming apparatus uses a gas burner which comprises a burner body and a plurality of tubular flame nozzles projecting radially from the burner body. The tubular nozzles have an internal diametr which ranges from about 1 mm to about 4 mm, and the projecting length of the tubular nozzles which extends from the burner body is within a range of from about 10 mm to about 40 mm. The nozzles have axially directed nozzle openings. The warming apparatus comprises the gas burner in combination with first and second radiators and a heat interception plate positioned between the burner body and the radiators.

12 Claims, 5 Drawing Figures

WARMING APPARATUS

BACKGROUND OF THE INVENTION

1. Field of the Invention

This invention relates to a gas burner and a warming apparatus (i.e. a warmer) having the burner for use in agriculture and stockbreeding, and more particularly to a burner having no tendency to exhibit backfiring and a warming apparatus for use in agriculture and stockbreeding which warms agricultural products, domestic animals or poultry by radiation heat radiated by heating radiation surfaces with the gas burner.

Illustrations of suitable use of the apparatus of this invention are brooders, poult cages, swine cages, dryers for tobacco and grains, and the like.

The present invention will be explained herein relative to brooders or poult cages as a non-limiting example.

2. Description of the Prior Art

Brooders and poult cages are known in the art and a poult cage heater is described in Japanese Utility Model Registration No. 921354. In brooders known in the art, almost all of the warming apparatuses use frameworks (or frames) having large surface areas as a radiation surface. The frames are heated with a burner and radiation heat radiated from the heated frames is utilized. However, a frame has a considerable weight and therefore, it is necessary to use a brooder having a strong ceiling so as to support the heavy warming apparatus. Further, a frame has a tendency to crack by the repetition of thermal stress and shock which are caused by rapid temperature changes. Such cracking of the frame often injures poults by dropping fragments of the frame thereon. Further, if a heated frame drops on tobacco or grains, it would result in a danger of fire.

I have noted the deficiencies of the framework-type warming apparatus and have studied for a long time to develop a light weight warming apparatus which has high heating efficiency and has no risk to cause cracking. It was known prior to the present invention that a warming apparatus may have a single radiator made of perforated metal plate. However, the warming apparatus having a single radiator made of a perforated metal plate shows insufficient heating efficiency and the heating efficiency itself varies in a wide range depending upon the regulation of the fuel gas flow rate by a thermostat. The reason for the wide variation of heating efficiency would be ascribed to the fact that by the regulation of the fuel gas flow rate, the shape and size of the flame are varied and the contact of the flame with the perforated plate changes significantly. Further the regulation of the fuel gas flow rate often causes local heating of the radiator and if a small flame is used, the flame cannot contact with the perforated plate.

Prior to the study to develop the present invention, I studied how to overcome the deficiencies mentioned above concerning a warming apparatus having a single radiator made of a perforated metal plate, and found that if radiators made of perforated metal plates are disposed adjacent each other and flame is to be located between the two radiators, heating efficiency is improved and the radiators are heated substantially uniformly independent of the fuel gas flow rate. I had found that by the use of the warming apparatus having dual radiators made of perforated metal plates, fuel consumption could be saved by around 20% even in full capacity operation, and could be saved by around 50% in a low capacity operation by throttling a fuel valve when compared with conventional warming apparatuses heretofore used. Based upon the findings described above, I proposed a warming apparatus having dual radiators made of perforated metal plates (Japanese Utility Model application No. 89245/1978; Japanese Utility Model Disclosure No. 10003/1980).

I prepared 50 units of warming apparatuses in accordance with Japanese Utility Model application No. 89245/1978 and they were tested in poultry yards. Unexpectedly, the results reported by the poultry yards were unfavorable. The poultry yards reported that the warming apparatuses often exhibit backfiring. The burners used in the warming apparatuses supplied for testing were burners of conventional type used successfully for a long time in conventional frame-work type warming apparatuses without receiving reports on backfiring.

SUMMARY OF THE INVENTION

From the above, I knew that if new type radiation surfaces are utilized in a warming apparatus, it would be necessary to change type and shape of the burner to be employed in the new warming apparatus so as to accommodate to the new type radiation surfaces. From long experiences in the manufacturing of burners and warming apparatuses, I have known the fact that to prevent backfiring it is helpful to use a flame pore of small diameter and to thicken the burner wall. Accordingly, I have tried the two procedures mentioned above with the warming apparatuses tested in poultry yards. However, no remarkable improvement could be obtained.

I have further continued the study on a procedure to avoid backfiring in the new warming apparatus, and found that when a burner having multiple tubular flame nozzles extending radially from the burner body is used, the new warming apparatuses tested in poultry yards could be used successfully without the problem of backfiring.

Accordingly, the first object of this invention is to provide a burner which can prevent the problem of backfiring. The second object of this invention is to provide a new warming apparatus which has no tendency to exhibit backfiring. The third object of this invention is to provide a warming apparatus of light weight, having high heating efficiency and having no risk of backfiring. Other objects of this invention will be obvious and will appear hereinafter.

As is apparent from the above, the burner of this invention was developed mainly to avoid backfiring in a warming apparatus having dual radiators made of perforated metal plates. However, of course, the burner of this invention is also effective in a conventional framework-type warming apparatus and can minimize the occurrence of backfiring in such warming apparatus. It can easily be understood by one skilled in the art that backfiring in poult cages and swine cages interferes with the growth of poults and swines, since they do not eat food when shocked by a sudden large sound and they become nervous. Further, a strong wind caused by the backfire often blows out a pilot flame and results in the outflow of fuel gas in the cage which would invite a risk of fire. Accordingly, the prevention of backfiring is an extremely important problem in a warming apparatus to be used in poult or swine cages.

Accordingly, the gist of this invention resides in a burner having multiple tubular flame nozzles extending or projecting radially from the burner body and a warming apparatus for use in agriculture and stockbreeding which comprises a burner having multiple tubular flame nozzles extending or projecting radially from the burner body, a first radiator made of a perforated metal plate and a second radiator made of a perforated metal plate, wherein the second radiator is positioned above the first radiator.

The reason why backfiring often occurs in a warming apparatus having dual radiators made of perforated metal plates, even if a burner having no tendency to cause backfiring in a conventional warming apparatus is used, is not yet fully understood but I think that probably, the reason therefor is as follows: In the warming apparatus having dual radiators, the temperature of the burner body rises to a higher level than the temperature found in a conventional framework-type warming apparatus, since in the warming apparatus having dual radiators, the heating efficiency is higher than that of a conventional warming apparatus and in the warming apparatus having dual radiators, radiation surfaces can be extended to a nearer position of the burner when compared with a conventional apparatus. Backfire of gas can only occur when the flame propagating velocity is higher than the velocity of the fuel gas supply. Even if the flame propagating velocity is higher than the velocity of the fuel gas supply, if the flame disappears in the flame nozzle or burner wall, backfiring cannot occur. It is considered that in a conventional warming apparatus, backfiring is prevented by a cooling effect of the burner wall, since in a conventional warming apparatus, the temperature of the burner wall is relatively low. Accordingly, in a conventional warming apparatus, even if a flame enters into the flame nozzle, the flame disappears in the nozzle by the cooling effect of the burner wall. The burner of this invention, i.e. a burner having multiple tubular flame nozzles extending radially from the burner body, is prepared in compliance with my thought above and the burner could completely prevent backfiring. The long tubular flame nozzles extending from the burner body can provide sufficient cooling effect to prevent backfire. From the above, it is apparent that to prevent backfire, the degree of cooling in the flame nozzle is important. In other words the ratio of the cross-sectional area of the gas path and the area of the surrounding surface thereof is important.

Accordingly, the cross-section of the tubular flame nozzle, hereinafter called flame pipe, is not necessarily limited to a circle and a flame pipe having a cross-section of an oval or a polygon can also be used without disadvantage. The length of the flame pipe is determined so as to give a sufficient cooling effect and the preferred range of the length is varied depending upon the diameter, temperature, etc. The length can be shortened when a flame pipe of small diameter and in low temperature is used. It is preferred that the internal diameter of the flame pipe is selected within a range from 1 mm to 4 mm and the length thereof is from 10 mm to 40 mm. When flame pipe having an internal diameter of higher than 4 mm is used, the risk of backfiring cannot be avoided completely and if a flame pipe having an internal diameter of less than 1 mm is used, the warming effect is insufficient due to the shortage of fuel gas supply. If the length is shorter than 10 mm, prevention of backfiring is insufficient and even if a flame pipe is extended more than 40 mm, no special merit can be obtained from such excess length.

In the warming apparatus of this invention, it is preferred to provide a heat interception plate between the burner and the radiators so as to maintain the burner at a relatively low temperature. Use of a heat interception plate is effective to shorten the length of the flame pipe and, therefore, allows the use of wider radiators (radiation surfaces). Further, the use of a heat interception plate is also effective to warm the outer side of the poult cage, since a part of the heat radiated from the radiation surfaces is reflected by the heat interception plate to the outer side of the cage. As stated before, in the warming apparatus of this invention, even if the supply of fuel gas is reduced, there is no fear of backfiring, and therefore, the flow rate of gas can be controlled in a proportional action by a throttle-valve which is actuated by a thermometer. Thus, by the use of the warming apparatus of this invention, temperature control can easily be accomplished.

In a conventional apparatus heretofore used, temperature control is conducted by the use of a snap valve, i.e. a kind of on-off valve, which is actuated by a thermostat and in a conventional warming apparatus, the use of a proportional action valve is avoided. The reason therefor is that in a conventional apparatus, if the rate of fuel supply is reduced, there is a risk of backfiring and the heating efficiency varies significantly depending upon the flow rate of the fuel gas.

DETAILED DESCRIPTION

Figure 1:
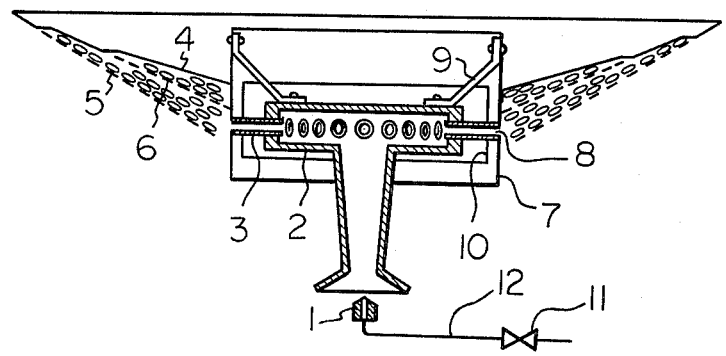
FIG. 1 is a cross-sectional view of a preferred embodiment of the warming apparatus of this invention.

Referring to FIG. 1, a frustoconical (shape of a frustrum of a cone) heat reflecting plate 4 enlarging upwardly is shown at the top of the figure. In the embodiment illustrated in FIG. 1, both ends, i.e. lower and upper ends, of the frustoconical heat reflecting plate 4 are not closed. The circular openings formed by the lower and upper ends of the frustoconical heat reflecting plate 4 are acting as a stack and assist the cooling of burner body 2 and flame pipe 3 by the circulation of air through the frustoconical space. Beneath the heat reflecting plate 4, a second radiator 6 made or a perforated metal plate having a frustoconical shape is provided. Further, beneath the second radiator 6, a first radiator 5 made of a perforated metal plate having a frustoconical shape is provided. Similar to the reflecting plate 4, the lower ends of the second radiator 6 and the first radiator 5 are not closed and form circular openings. It is preferred that the degree of inclination of the first radiator 5 is higher than that of the second radiator 6 and the first radiator 5 and the heat reflecting plate 4 are combined at the outer end thereof. Between the first radiator 5 and the second radiator 6, it is necessary to have some distance and the arrangement to provide two radiators so close to each other is undesirable. If the two radiators 5, 6 are arranged so closely, combustion of fuel will be interfered with an incomplete combustion will occur. Therefore, between the two radiators, it is preferred to provide a distance of about two times the widths of the flame.

In the figures, the cross-sections of the frustocones are shown as circles. However, it is obvious to a person skilled in the art that the cross-section of the frustocone can be a polygonal shape. The diameter of the lower end of frustoconical second radiator 6 is substantially the same as that of heat reflecting plate 4. The diameter of the lower end of frustoconical first radiator 5 is somewhat larger than those of the second radiator 6 and heat reflecting plate 4. Further, in the warming apparatus, a heat interception plate 7 is provided and the lower end of the heat reflecting plate 4 contacts the heat interception plate 7 just above its midsection. The heat interception plate 7 prevents heating of burner body 2 and flame pipes 3 by reflecting the heat radiated from the radiators and by accelerating air circulation through the cylindrical space as a stack. The second radiator 6 extends to the heat interception plate 7, but between the heat interception plate 7 and the first radiator 5, it is necessary to provide a substantial distance. The distance found between the plate 7 and the radiator 5 can provide a sufficient space to allow entering of secondary air. To obtain an excellent result, it is preferred to use perforated metal plate having a perforation density of from 15% to 60% as radiation surfaces. The radiators 5 and 6 should be made of a heat resisting metal and examples of suitable metals are SUS430 and SUS301.

Figure 2:
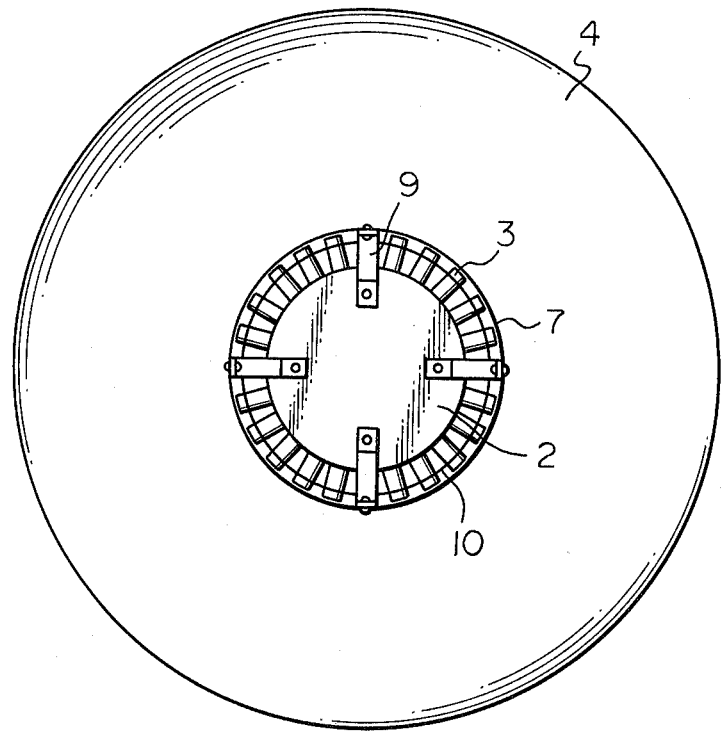
FIG. 2 is a top plan view of the apparatus shown in FIG. 1.

In the figures, numeral 1 shows a gas nozzle and it is designed to induce primary air between burner body 2 and gas nozzle 1. Gas nozzle 1 receives fuel gas from line 12 which has a valve 11 therein. In the figures, the upper portion of burner body 2 is extended to form a disk-like shape and at the outer periphery of the disk, many tubular flame pipes 3 are provided radially as seen in FIG. 2. The heat interception plate 7 has many small holes 8. The number of the small holes 8 and the position thereof are determined so as to correspond to the number and the position of the flame pipes 3. The outer end of a flame pipe 3 is located in the small hole 8 of the heat interception plate 7. If the outer end of the flame pipe 3 projects outwardly of the heat interception plate 7, the extended portion of the flame pipe 3 will receive undesirable over heating. It is also undesirable that the outer end of the flame pipe 3 is located within the heat interception plate 7. The reason therefor is that in the arrangement mentioned above, if the relative position of the flame pipe 3 and heat interception plate 7 is changed by some causes, the flame contacts with the heat interception plate 7 which not only results in lowering of heating efficiency but also results in undesirable overheating of heat interception plate 7 and flame pipe 3. Accordingly, it is preferred to locate the outer end of the flame pipe 3 in the small hole 8 of heat interception plate 7. In the figures, numeral 9 shows a connector which connects the burner body 2 and the heat interception plate 7. Numeral 10 shows a guide which determines the position of the flame pipes 3. The guide 10 is located inside the heat interception plate 7 and concentric with it. The guide 10 has many small holes and the flame pipes 3 extend from the burner body 2 through the holes of guide 10. The position of flame pipes 3 is fixed thereby.

In the embodiment shown in the figures, the flame pipe 3 has following dimensions: Internal diameter 3 mm; External diameter 5 mm and Length 15 mm. The connection of the heat interception plate 7 and the heat reflecting plate 4 can be carried out in any suitable manner, such as by welding or bolting. In the embodiment shown in the figures, the outer end of flame pipe 3 is located between the first radiator 5 and the second radiator 6. Accordingly, the flame can extend through the space formed between the first and the second radiators.

Figure 3:
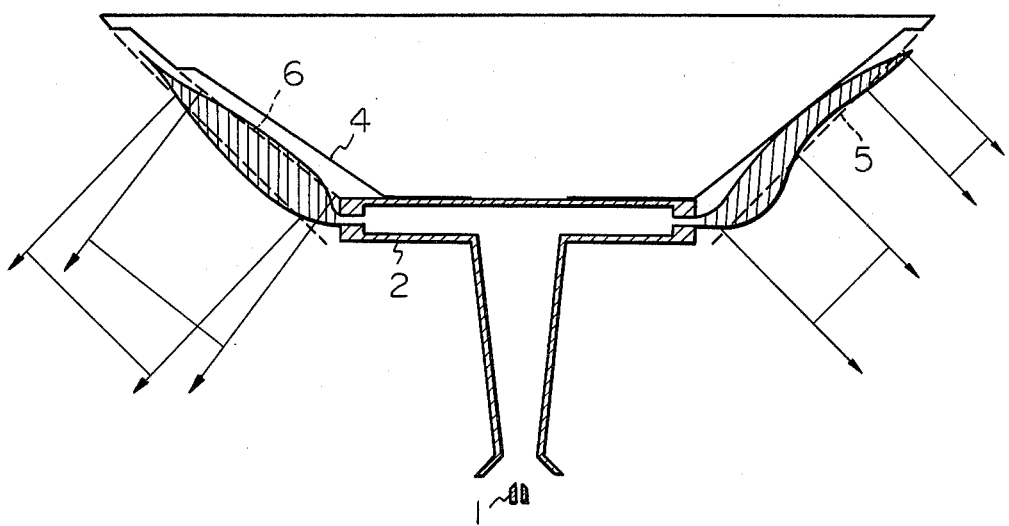
FIGS. 3 to FIG. 5 are simplified cross-sectional views of prior art warming apparatuses in which the left hand sides of the figures show a warming apparatus having dual radiators made of perforated metal plates specified in the present invention, and the right hand sides of the figures show a warming apparatus having single radiator made of a perforated metal plate.
Figure 4:
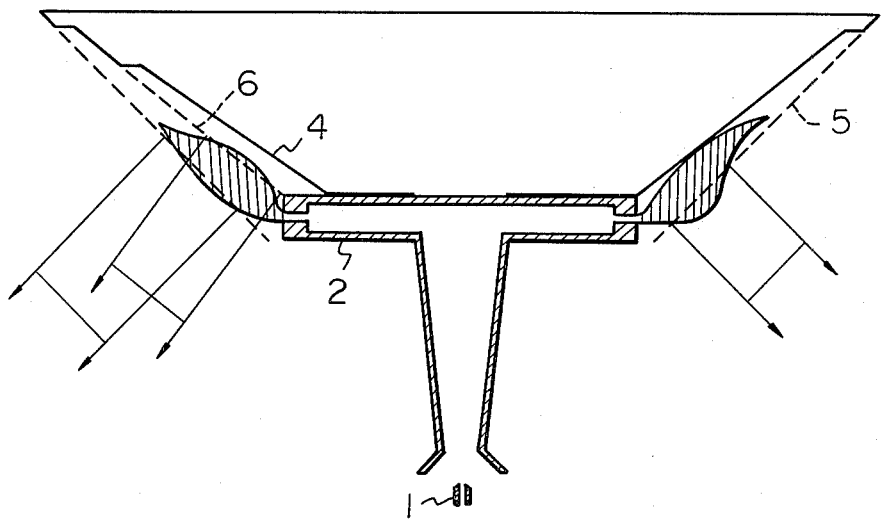
Figure 5:
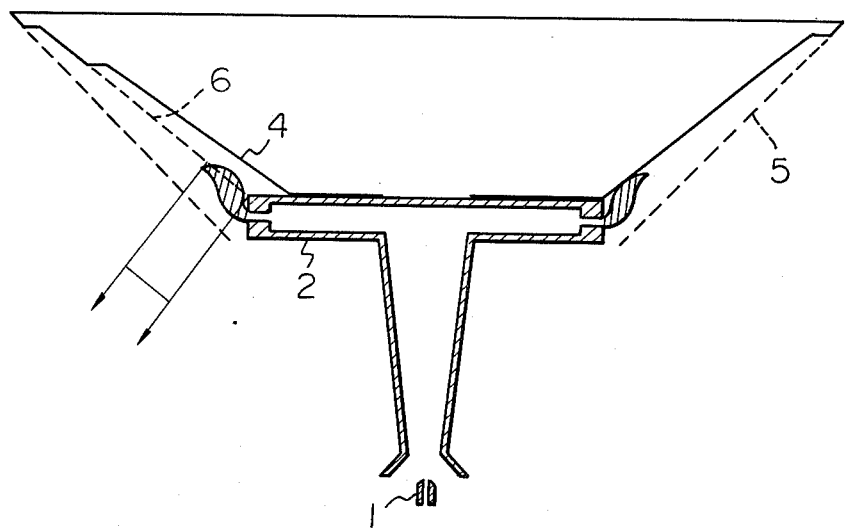

As stated above, the warming apparatus of this invention has dual radiators made of perforated metal plates. As would be apparent from the prior art as shown in FIGS. 3-5, the use of dual radiators can minimize waving of the flame and provides a uniform heating of the radiators. In the warming apparatus of this invention, even if the flame is shortened, the contacts of the flame with the second radiator 6 are still effectively maintained and the heat radiated from the hot second radiator 6 can reach the bed of the cage directly or indirectly via the heating of the first radiator. If the second radiator 6 is made of a flat plate having no perforations, the result obtained thereby is essentially the same as that obtained by the use of a warming apparatus having a single radiator. The explanation for the difference of the results obtained by the use of single radiator and dual radiators is not yet clear to me, but it is my thought that the difference may arise from the following causes. By the use of a second radiator made of perforated metal plate, the contacts of the flame and the second radiator are improved and the perforations enhance the formation of small vortexes around the flame which improve the contacts between the fuel and secondary air. Naturally, sufficient contacts of fuel with an appropriate amount of air results in a high combustion temperature and may increase radiation of heat.

As heated above, the apparatus of this invention has no tendency of backfiring, even if the fuel supply is controlled by the use of a throttle-valve. Accordingly, in a brooder or a poult cage, when an actual temperature deviates from a set temperature, the deviation of temperature can be compensated by increasing or decreasing the fuel supply in proportion to the deviation of temperature by valve 11 in the fuel gas supply line 12. Thus, temperature control can be effected easily by the use of the burner and the warming apparatus of this invention. The fact mentioned above can give significant improvement in controlling of temperature when compared with the use of a conventional apparatus in which a throttle-valve cannot be used and an on-off valve can only be used to avoid a danger of backfiring. Accordingly, in a preferred embodiment, the burner or the warming apparatus of this invention is used in combination with a valve 11 (FIG. 1) workable with a proportional action, such as a throttle-valve. The term "proportional action" used herein means not only "proportional action" in a strict sense but also "proportional-integral action" and "proportional-integral-derivative action". The mechanism of these three kinds of controlling operations and the effects obtained thereby are well known in the art.

In the description above, the present invention is described relative to a warming apparatus for a poult cage, but it would be apparent to a person skilled in the art that the present invention can be used in other fields. For example, the burner and the warming apparatus of this invention can be used in a swine cage. In such case, however, it is preferred to use a somewhat smaller apparatus than those used in a poult cage.

From the explanations given above, the merits obtainable by the use of the burner and the warming apparatus of this invention can easily be understood by a person skilled in the art.

I claim:

1. A gas burner comprising:
   a burner body;
   means for supplying a gas air mixture to said burner body;
   a plurality of tubular flame nozzles projecting radially from said burner body, the internal diameter of each of said tubular flame nozzles being within a range of from about 1 mm to about 4 mm and the projecting length thereof which extends from said burner body being within a range of from about 10 mm to about 40 mm, said tubular flame nozzles having nozzle openings which open axially of the respective tubular flame nozzles; and
   a heat interception plate provided substantially at the outer end of each of said tubular flame nozzles.

2. A warming apparatus for use in agriculture and stockbreeding which comprises:
   a gas burner having a burner body, means for supplying a gas air mixuture to said burner body, and a plurality of tubular flame nozzles projecting radially from said burner body;
   a first radiator made of perforated metal plate;
   a second radiator made of perforated metal plate, said second radiator being positioned above and spaced from said first radiator; and
   a heat interception plate positioned between said burner body and said radiators.

3. The apparatus of claim 2, wherein the perforation density of said perforated metal plate pf said first and second radiators is within a range of from about 15% to about 60%.

4. The apparatus of claim 2 or 3, wherein the internal diameter of each of said tubular flame nozzles is within a range of from about 1 mm to about 4 mm and the projecting length thereof which extends from said burner body is within a range of from about 10 mm to about 40 mm.

5. The apparatus of claim 4, wherein said radiators are located relative to said tubular flame nozzles such that a flame generated by said tubular flame nozzles extends through the space formed between said first and second radiators.

6. The apparatus of claim 2 or 3, wherein said radiators are located relative to said tubular flame nozzles such that a flame generated by said tubular flame nozzles extends through the space formed between said first and second radiators.

7. The apparatus of claim 4, wherein said heat interception plate is located substantially at the outer end of each of said tubular flame nozzles.

8. A method for controlling a temperature in an enclosure for use in agriculture and stockbreeding to a set temperature with a burner without causing backfiring in the burner, comprising:
   providing a warming apparatus having a gas burner which includes a burner body, means for supplying a gas air mixture to said burner body, and a plurality of tubular flame nozzles projecting radially from said burner body; a first radiator made of perforated metal plate; a second radiator made of perforated metal plate, said second radiator being positioned above and spaced from said first radiator; a heat interception plate positioned between said burner body and said radiators; and means for supplying fuel to said burner, said fuel supplying means including a controllable valve;
   detecting a difference between a set temperature and the actual temperature in said enclosure; and
   controlling said controllable valve to control the fuel supply to said burner as a function of the detected temperature difference between said set temperature and said actual temperature in said enclosure.

9. The method of claim 8, wherein the perforation density of said perforated metal plate of said first and second radiators is within a range of from about 15% to about 60%.

10. The method of claim 8 or 9, wherein the internal diameter of each of said tubular flame nozzles is within a range of from about 1 mm to about 4 mm and the projecting length thereof which extends from said burner body is within a range of from about 10 mm to about 40 mm.

11. The method of claim 10, wherein said first and second radiators are located relative to said flame nozzles such that the flame generated by said flame nozzles extends between the space formed between said first and second radiators.

12. The method of claim 8 or 9, wherein said first and second radiators are located relative to said flame nozzles such that the flame generated by said flame nozzles extends between the space formed between said first and second radiators.

* * * * *

UNITED STATES PATENT AND TRADEMARK OFFICE
CERTIFICATE OF CORRECTION

PATENT NO. : 4,458,663
DATED : July 10, 1984
INVENTOR(S) : Ichiro KANESAKA

It is certified that error appears in the above-identified patent and that said Letters Patent is hereby corrected as shown below:

In the Abstract, line 4, change "diametr" to --diameter--;

COLUMN 1, line 61, after "other and" insert --a--;

COLUMN 2, line 62, after "large sound" insert --,--;

COLUMN 3, line 62, after "When" insert --a--;

COLUMN 4, line 36, change "Figs. 3" to --Fig. 3--;

COLUMN 6, line 36, after "As" change "heated" to --stated--;

COLUMN 7 (claim 3), line 34, after "plate" change "pf" to --of--.

Signed and Sealed this

Nineteenth Day of March 1985

[SEAL]

Attest:

DONALD J. QUIGG

Attesting Officer     Acting Commissioner of Patents and Trademarks